US012566059B2

(12) United States Patent
Nakamura et al.

(10) Patent No.: US 12,566,059 B2
(45) Date of Patent: Mar. 3, 2026

(54) OPTICAL FIBER STRAIN MEASURING METHOD AND OPTICAL FIBER STRAIN MEASURING DEVICE

(71) Applicant: NTT, Inc., Tokyo (JP)

(72) Inventors: Atsushi Nakamura, Musashino (JP); Yusuke Koshikiya, Musashino (JP); Nazuki Honda, Musashino (JP)

(73) Assignee: NTT, Inc., Tokyo (JP)

( * ) Notice: Subject to any disclaimer, the term of this patent is extended or adjusted under 35 U.S.C. 154(b) by 251 days.

(21) Appl. No.: 18/286,140

(22) PCT Filed: May 7, 2021

(86) PCT No.: PCT/JP2021/017573
§ 371 (c)(1),
(2) Date: Oct. 9, 2023

(87) PCT Pub. No.: WO2022/234676
PCT Pub. Date: Nov. 10, 2022

(65) Prior Publication Data
US 2024/0035808 A1     Feb. 1, 2024

(51) Int. Cl.
*G01B 11/16*        (2006.01)

(52) U.S. Cl.
CPC .............. *G01B 11/16* (2013.01); *G01B 11/18* (2013.01)

(58) Field of Classification Search
CPC ................................ G01B 11/16; G01B 11/18
(Continued)

(56) References Cited

U.S. PATENT DOCUMENTS 9,400,221 B2 * 7/2016 Sarchi .................. G01M 11/086
2007/0201793 A1 * 8/2007 Askins ............... G02B 6/02042
385/5
(Continued)

FOREIGN PATENT DOCUMENTS

CN        110243301 A  *  9/2019  ............. G01B 11/16
CN        110243305 A  *  9/2019  ............. G01B 11/16
(Continued)

OTHER PUBLICATIONS

Translation_CN112665518 (Year: 2021).*
(Continued)

*Primary Examiner* — Peter J Macchiarolo
*Assistant Examiner* — Monica S Young

(57) ABSTRACT

The present disclosure relates to an optical fiber strain measurement method including, in order: a strain amount measurement step S2 of measuring a strain amount $\varepsilon_n'$ of each core wire of an optical fiber ribbon F; a torsion angle calculation step S3 of calculating a torsion angle $\gamma$ per unit length of the optical fiber ribbon F on the basis of a difference $\varepsilon'$ in strain amount between an outer core wire and an inner core wire; a torsional strain amount calculation step S4 of calculating a strain amount $\varepsilon_n$ caused by torsion of each core wire of the optical fiber ribbon F on the basis of the torsion angle $\gamma$; and a tensile strain amount calculation step S5 of subtracting the strain amount $\varepsilon_n$ from the strain amount $\varepsilon_n'$, and calculating a strain amount $\Delta\varepsilon_n$ caused by tension of each core wire of the optical fiber ribbon F.

8 Claims, 6 Drawing Sheets

$$L_n' = (L_0 + \Delta L)\sqrt{1 + r_n^2\gamma^2} \ (n=1, 2)$$

$$\varepsilon_n' = \frac{L_n' - L_0}{L_0} = (1 + \frac{\Delta L}{L_0})\sqrt{1 + r_n^2\gamma^2} - 1$$

$$\Delta\varepsilon' = \varepsilon_1' - \varepsilon_2' = \left(1 + \frac{\Delta L}{L_0}\right)\left(\sqrt{1 + r_1^2\gamma^2} - \sqrt{1 + r_2^2\gamma^2}\right)$$

$$\cong \sqrt{1 + r_1^2\gamma^2} - \sqrt{1 + r_2^2\gamma^2} \ (\frac{\Delta L}{L_0} \ll 1)$$

$$\Delta\varepsilon_n = \varepsilon_n' - \varepsilon_n = \frac{\Delta L}{L_0}\sqrt{1 + r_n^2\gamma^2} \cong \frac{\Delta L}{L_0} \ (r_n^2\gamma^2 \ll 1)$$

(58) Field of Classification Search
USPC .......................................................... 73/800
See application file for complete search history.

(56)                    References Cited

U.S. PATENT DOCUMENTS

| | | | | |
|---|---|---|---|---|
| 2015/0148654 A1 * | 5/2015 | Whanwook | ........ | G01N 29/0672 |
| | | | | 600/407 |
| 2016/0161350 A1 * | 6/2016 | Balasubramaniam | .. | G01L 1/246 |
| | | | | 73/800 |
| 2023/0332931 A1 * | 10/2023 | Kishida | .................. | G01D 5/353 |

FOREIGN PATENT DOCUMENTS

| | | | | | |
|---|---|---|---|---|---|
| CN | 111289020 A | * | 6/2020 | ......... | G01D 5/35374 |
| CN | 112665518 A | * | 4/2021 | | |
| CN | 112703365 A | * | 4/2021 | ............ | G02B 6/022 |
| CN | 116368348 A | * | 6/2023 | ............ | G01B 11/18 |
| EP | 3971519 A1 | * | 3/2022 | ............ | G01B 11/18 |

OTHER PUBLICATIONS

Translation_CN110243305 (Year: 2019).*
A. Nakamura et al., "Torsion Sensing Based on Strain Measurement of 4-Fiber Ribbons: Feasibility Investigation", ICETC, A2-2, 2020.

* cited by examiner

Fig. 5

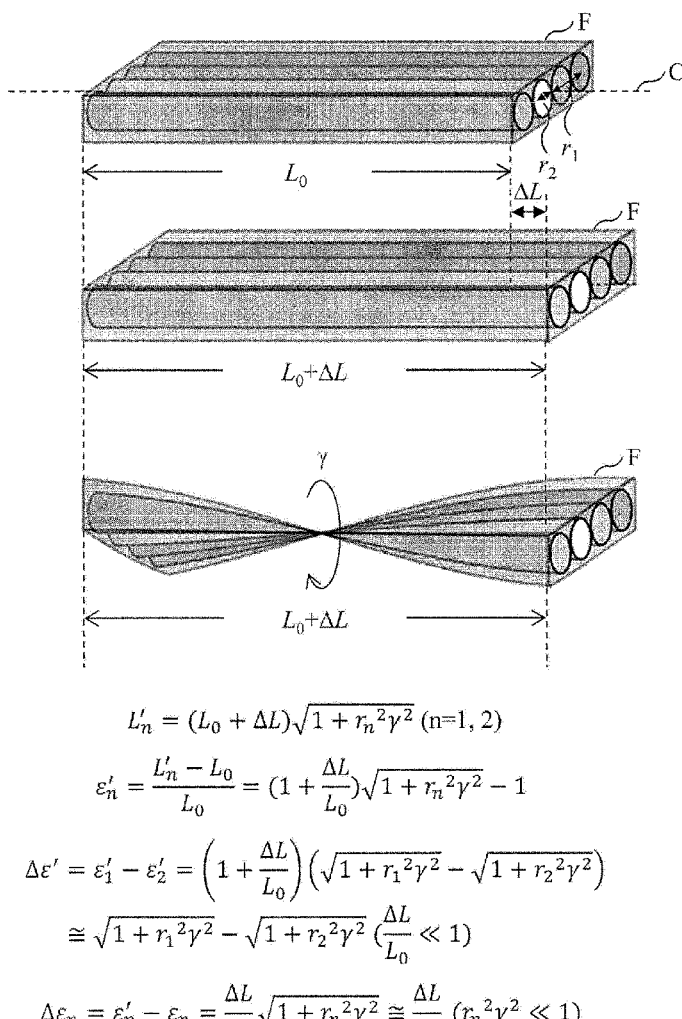

$$L'_n = (L_0 + \Delta L)\sqrt{1 + r_n^2\gamma^2} \; (n=1, 2)$$

$$\varepsilon'_n = \frac{L'_n - L_0}{L_0} = (1 + \frac{\Delta L}{L_0})\sqrt{1 + r_n^2\gamma^2} - 1$$

$$\Delta\varepsilon' = \varepsilon'_1 - \varepsilon'_2 = \left(1 + \frac{\Delta L}{L_0}\right)\left(\sqrt{1 + r_1^2\gamma^2} - \sqrt{1 + r_2^2\gamma^2}\right)$$

$$\cong \sqrt{1 + r_1^2\gamma^2} - \sqrt{1 + r_2^2\gamma^2} \; (\frac{\Delta L}{L_0} \ll 1)$$

$$\Delta\varepsilon_n = \varepsilon'_n - \varepsilon_n = \frac{\Delta L}{L_0}\sqrt{1 + r_n^2\gamma^2} \cong \frac{\Delta L}{L_0} \; (r_n^2\gamma^2 \ll 1)$$

$$L_n = L_0\sqrt{1 + r_n{}^2\gamma^2} \ (n=1, 2)$$

$$\varepsilon_n = \frac{L_n - L_0}{L_0} = \sqrt{1 + r_n{}^2\gamma^2} - 1$$

OPTICAL FIBER STRAIN MEASURING METHOD AND OPTICAL FIBER STRAIN MEASURING DEVICE

TECHNICAL FIELD

The present disclosure relates to technology for measuring the strain amount of each core wire of an optical fiber ribbon.

BACKGROUND ART

As a sensor for measuring a strain amount of a structure in order to evaluate the physical deterioration of the structure, a sensor for measuring the strain amount of the structure using an optical fiber system has various advantages compared to a sensor for measuring the strain amount of the structure using an electric system, and has recently been attracting attention. In NPL 1, as a sensor for measuring a strain amount of a structure using an optical fiber system, the strain amount of each core wire of an optical fiber ribbon obtained by bundling a plurality of optical fibers in a tape shape is measured.

CITATION LIST

Non Patent Literature

[NPL 1] A. Nakamura et al., "Torsion Sensing Based on Strain Measurement of 4-Fiber Ribbons: Feasibility Investigation," ICETC, A2-2, 2020.

SUMMARY OF INVENTION

Technical Problem

In NPL 1, it was possible to calculate a torsion angle (torsion rate) per unit length of an optical fiber ribbon on the basis of the strain amount of each core wire of the optical fiber ribbon, but it was impossible to calculate the strain amount that is due to tension (compression) of the optical fiber ribbon.

Therefore, in order to solve the above problems, an object of the present disclosure is to calculate a torsion angle (torsion rate) per unit length of an optical fiber ribbon on the basis of the strain amount of each core wire of the optical fiber ribbon and to calculate the strain amount that is due to tension (compression) of the optical fiber ribbon.

Solution to Problem

In order to solve the above problems, where the optical fiber ribbon has torsional and tensile (compression) strain, the strain amount that is due to torsion of the optical fiber ribbon is separated from the strain amount to be extracted that is due to tension (compression) of the optical fiber ribbon.

Specifically, the present disclosure relates to an optical fiber strain measurement method including, in order: a strain amount measurement step of measuring a strain amount of each core wire of an optical fiber ribbon; a torsion angle calculation step of calculating a torsion angle per unit length of the optical fiber ribbon, based on a difference in strain amount between an outer core wire and an inner core wire of the optical fiber ribbon; a torsional strain amount calculation step of calculating a strain amount caused by torsion of each core wire of the optical fiber ribbon, based on the torsion angle per unit length of the optical fiber ribbon; and a tensile strain amount calculation step of subtracting the strain amount caused by torsion of each core wire of the optical fiber ribbon from the strain amount of each core wire of the optical fiber ribbon measured in the strain amount measurement step, and calculating a strain amount caused by tension of each core wire of the optical fiber ribbon.

Specifically, the present disclosure relates to an optical fiber strain measurement device including: a strain amount measurement unit configured to measure a strain amount of each core wire of an optical fiber ribbon; a torsion angle calculation unit configured to calculate a torsion angle per unit length of the optical fiber ribbon, based on a difference in strain amount between an outer core wire and an inner core wire of the optical fiber ribbon; a torsional strain amount calculation unit configured to calculate a strain amount caused by torsion of each core wire of the optical fiber ribbon, based on the torsion angle per unit length of the optical fiber ribbon; and a tensile strain amount calculation unit configured to subtract the strain amount caused by torsion of each core wire of the optical fiber ribbon from the strain amount of each core wire of the optical fiber ribbon measured by the strain amount measurement unit, and calculate a strain amount caused by tension of each core wire of the optical fiber ribbon.

By means of these configurations, it is practicable to calculate the torsion angle (torsion rate) per unit length and the strain amount that is due to torsion of the optical fiber ribbon on the basis of the strain amount of each core wire of the optical fiber ribbon and to calculate the strain amount that is due to tension (compression) of the optical fiber ribbon.

In the optical fiber strain measurement method according to the present disclosure, the torsion angle calculation step includes calculating the torsion angle per unit length of the optical fiber ribbon without taking an effect of tension of each core wire of the optical fiber ribbon into account.

In the optical fiber strain measurement device according to the present disclosure, the torsion angle calculation unit calculates the torsion angle per unit length of the optical fiber ribbon without taking an effect of tension of each core wire of the optical fiber ribbon into account.

By means of these configurations, although the strain amount that is due to tension (compression) of the optical fiber ribbon is an unknown amount, it is possible to easily calculate the torsion angle (torsion rate) per unit length of the optical fiber ribbon without considering the strain amount that is due to tension (compression) of the optical fiber ribbon.

In the optical fiber strain measurement method according to the present disclosure, the tensile strain amount calculation step includes calculating the strain amount caused by tension of each core wire of the optical fiber ribbon without taking an effect of torsion of each core wire of the optical fiber ribbon into account.

In the optical fiber strain measurement device according to the present disclosure, the tensile strain amount calculation unit calculates the strain amount caused by tension of each core wire of the optical fiber ribbon without taking an effect of torsion of each core wire of the optical fiber ribbon into account.

By means of these configurations, although the torsion angle (torsion rate) per unit length of the optical fiber ribbon is a known number, it is possible to easily calculate the strain amount that is due to tension (compression) of the optical fiber ribbon without considering the torsion angle (torsion rate) per unit length of the optical fiber ribbon.

The optical fiber strain measurement method according to the present disclosure further includes, subsequently, a structural strain amount calculation step of calculating strain amounts caused by torsion and tension of a structure in which the optical fiber ribbon is installed, based on the strain amounts caused by the torsion and the tension of each core wire of the optical fiber ribbon, respectively.

The optical fiber strain measurement device according to the present disclosure further includes a structural strain amount calculation unit configured to calculate strain amounts caused by torsion and tension of a structure in which the optical fiber ribbon is installed, based on the strain amounts caused by the torsion and the tension of each core wire of the optical fiber ribbon, respectively.

By means of these configurations, it is possible to calculate the strain amount that is due to torsion and the strain amount that is due to tension (compression) of not only the optical fiber ribbon used in optical fiber communication but also the optical fiber ribbon used in a structural strain sensor.

Advantageous Effects of Invention

Thus, the present disclosure is capable of calculating the torsion angle (torsion rate) per unit length of the optical fiber ribbon on the basis of the strain amount of each core wire of the optical fiber ribbon and calculating the strain amount that is due to tension (compression) of the optical fiber ribbon.

BRIEF DESCRIPTION OF DRAWINGS

FIG. 5 is a diagram illustrating the principle of calculating a strain amount in the optical fiber strain measurement method of the present disclosure.

DESCRIPTION OF EMBODIMENTS

Embodiments of the present disclosure will be described with reference to the accompanying drawings. The embodiments described below are examples of the present disclosure, and the present disclosure is not limited to the following embodiments.

Figure 1:
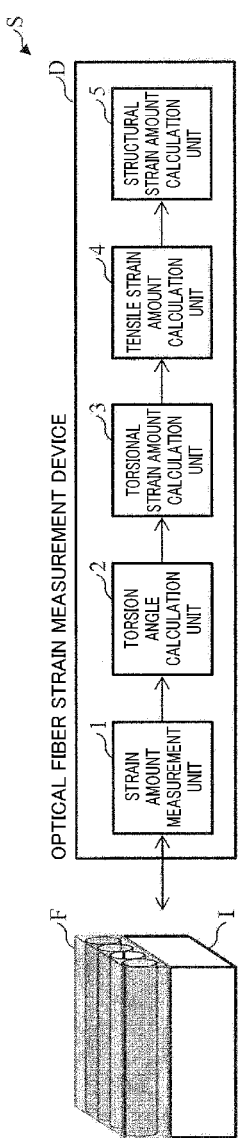
FIG. 1 is a diagram illustrating a configuration of an optical fiber strain measurement system of the present disclosure.

FIG. 1 illustrates a configuration of an optical fiber strain measurement system of the present disclosure. An optical fiber strain measurement system S includes an optical fiber strain measurement device D, an optical fiber ribbon F, and a structure I. In the present embodiment, the optical fiber ribbon F is integrated with the structure I and used as a structural strain sensor. As a modification example, the optical fiber ribbon F may be used as an optical fiber communication medium, which is not integrated with the structure I.

Figure 2:
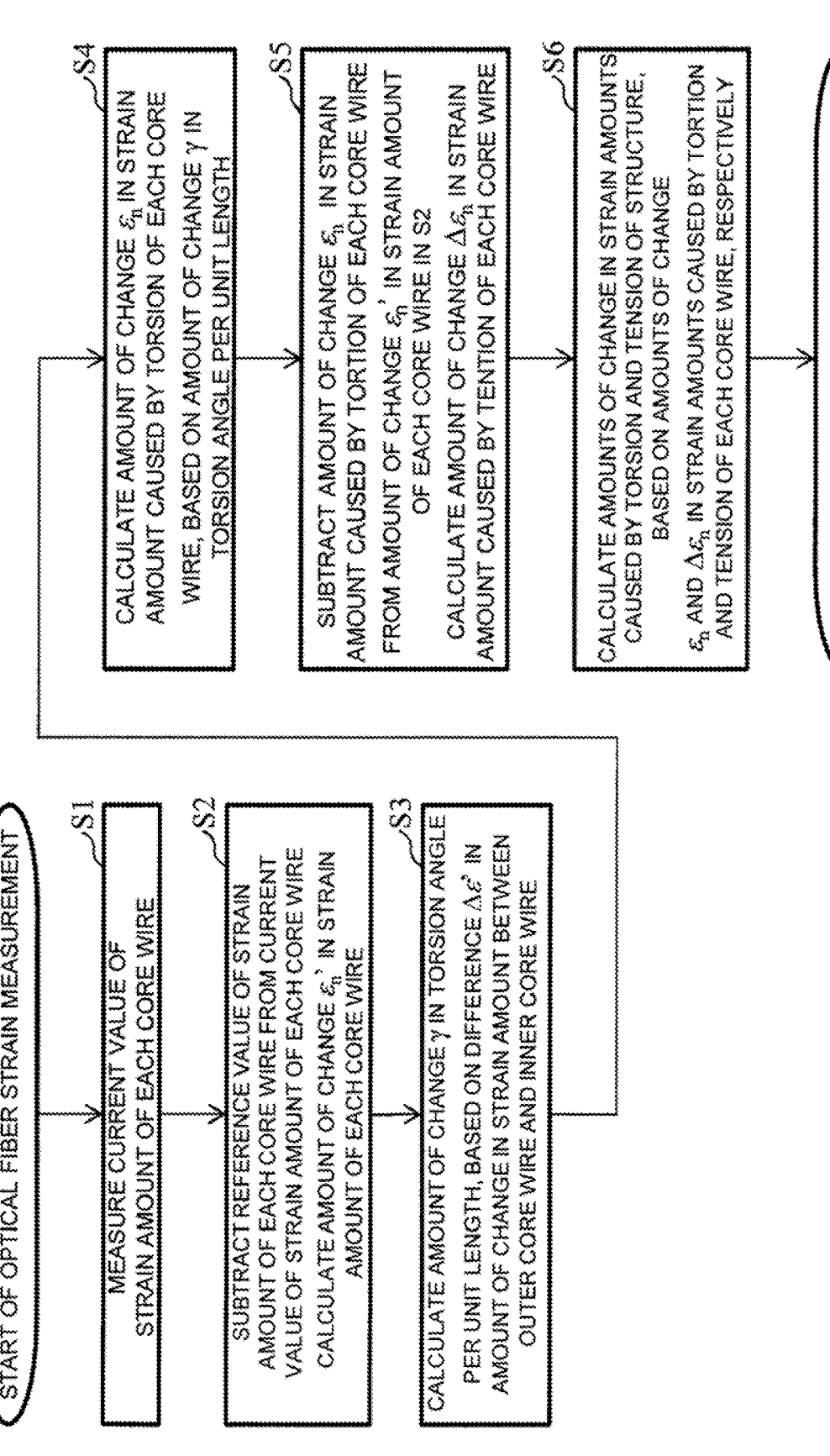
FIG. 2 is a diagram illustrating each step of an optical fiber strain measurement method of the present disclosure.

FIG. 2 illustrates each step of an optical fiber strain measurement method of the present disclosure. The optical fiber strain measurement device D includes a strain amount measurement unit 1, a torsion angle calculation unit 2, a torsional strain amount calculation unit 3, a tensile strain amount calculation unit 4, and a structural strain amount calculation unit 5. The optical fiber strain measurement device D can be implemented by installing a program of each step of the optical fiber strain measurement method, illustrated in FIG. 2, on a computer.

Figure 3:
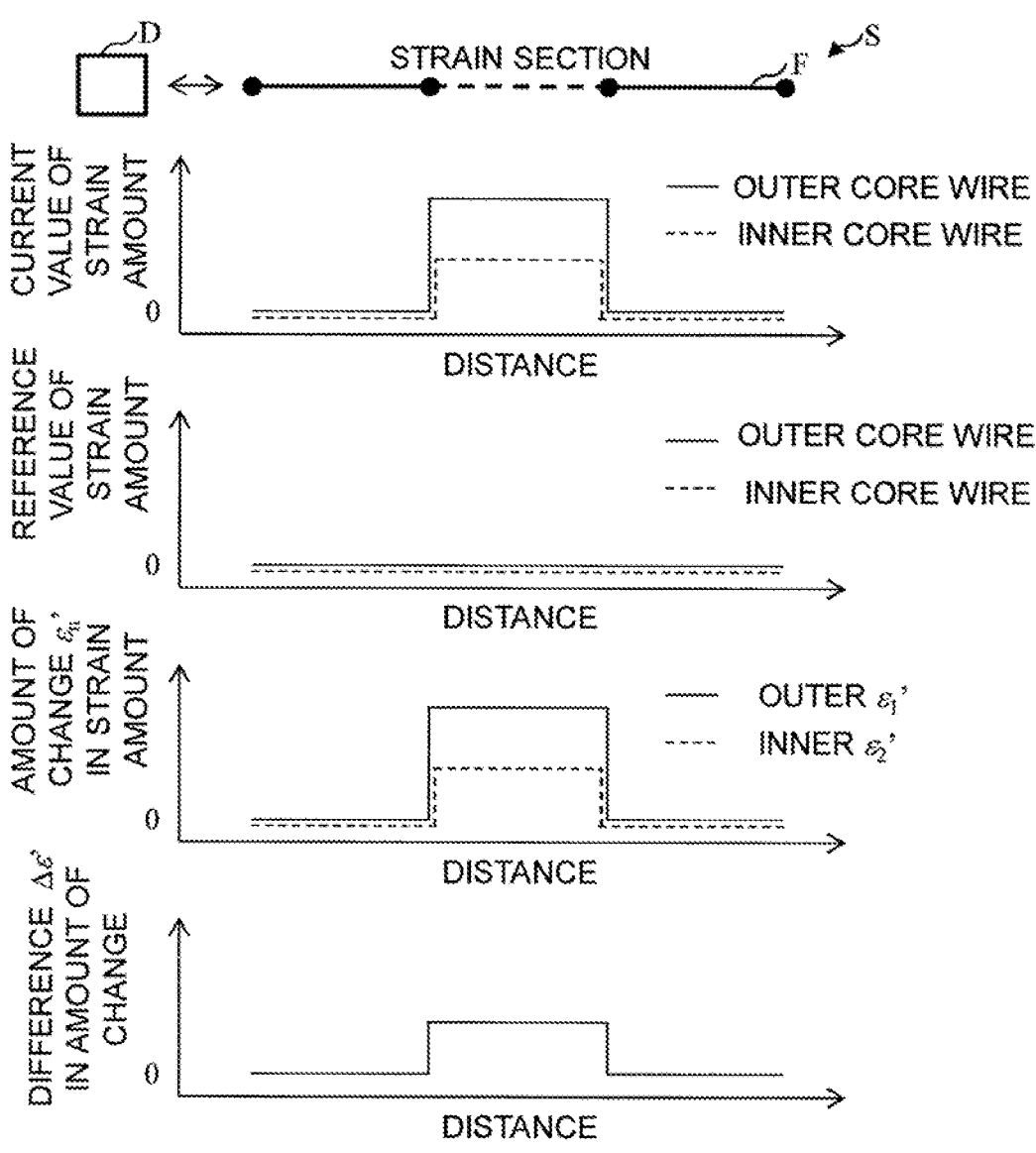
FIG. 3 is a diagram illustrating a specific example of each step of the optical fiber strain measurement method of the present disclosure.
Figure 4:
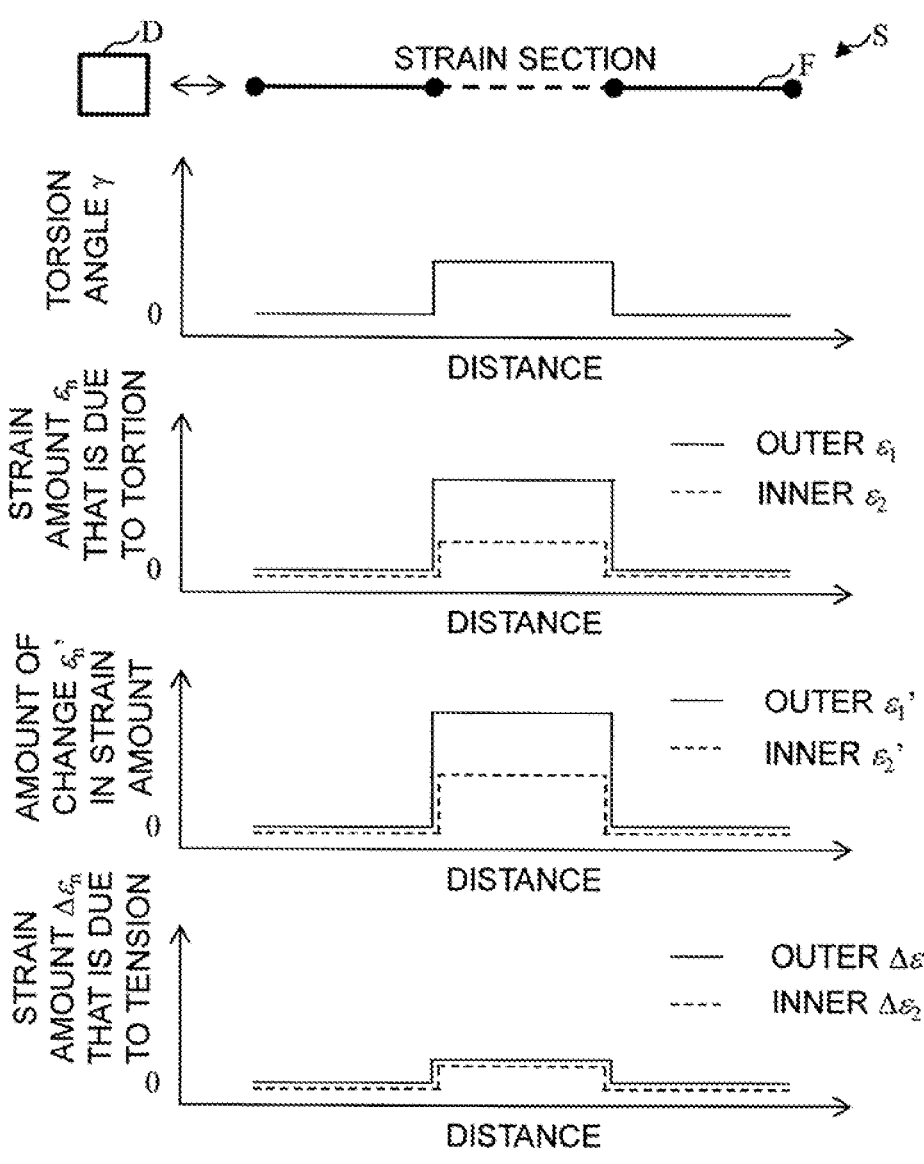
FIG. 4 is a diagram illustrating a specific example of each step of the optical fiber strain measurement method of the present disclosure.
Figure 6:
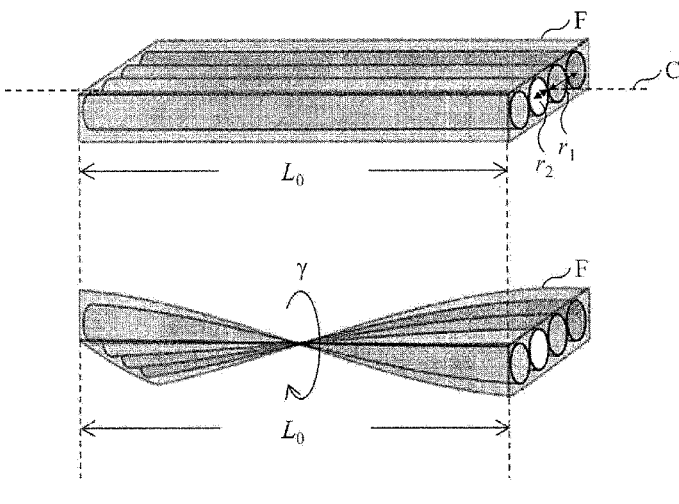
FIG. 6 is a diagram illustrating the principle of calculating a strain amount in the optical fiber strain measurement method of the present disclosure.

FIGS. 3 and 4 illustrate a specific example of each step of the optical fiber strain measurement method of the present disclosure. FIGS. 5 and 6 are illustrate the principle of calculating a strain amount in the optical fiber strain measurement method of the present disclosure.

The strain amount measurement unit 1 measures a current value of the strain amount of each core wire of the optical fiber ribbon F (strain amount measurement step S1). Here, the strain amount measurement unit 1 may measure the strain amount of each core wire of the optical fiber ribbon F on the basis of the Brillouin frequency shift using a Brillouin-optical time domain reflectometer (B-OTDR). Alternatively, the strain amount measurement unit 1 may measure the strain amount of each core wire of the optical fiber ribbon F on the basis of the Rayleigh scattering intensity distribution shift using an optical frequency domain reflectometer (OFDR).

The first graph of FIG. 3 illustrates a longitudinal distribution of the current value of the strain amount of the optical fiber ribbon F. In a section where torsional and tensile (compression) strain occurs, the current value of the strain amount of the outer core wires (the two outer core wires in FIGS. 5 and 6) of the optical fiber ribbon F is larger than that of the inner core wires (the two inner core wires in FIGS. 5 and 6) of the optical fiber ribbon F.

The strain amount measurement unit 1 subtracts a reference value of the strain amount of each core wire of the optical fiber ribbon F from the current value of the strain amount of each core wire of the optical fiber ribbon F, and calculates an amount of change $\varepsilon_n'$ (n=1, 2 correspond to the outer and the inner) in the strain amount of each core wire of the optical fiber ribbon F (strain amount measurement step S2). Here, the strain amount measurement unit 1 may use, as the reference value of the strain amount of each core wire of the optical fiber ribbon F, the strain amount=0 which represents no occurrence of torsional and tensile (compression) strain in the optical fiber ribbon F in the initial state.

Alternatively, the strain amount measurement unit 1 may use, as the reference value of the strain amount of each core wire of the optical fiber ribbon F, the strain amount ≠0 which represents occurrence of torsional and tensile (compression) strain in the optical fiber ribbon F even in the initial state.

The second graph of FIG. 3 illustrates a longitudinal distribution of the reference value of the strain amount of the optical fiber ribbon F. Even in the section where torsional and tensile (compression) strain occurs, the reference value of the strain amount is 0 regardless of whether the strain amount is of the outer core wires (the two outer core wires in FIGS. 5 and 6) of the optical fiber ribbon F or of the inner core wires (the two inner core wires in FIGS. 5 and 6) of the optical fiber ribbon F. The third graph of FIG. 3 illustrates a longitudinal distribution of the amount of change $\varepsilon_n'$ in the strain amount of the optical fiber ribbon F. In the section where torsional and tensile (compression) strain occurs, the amount of change $\varepsilon_n'$ in the strain amount of the outer core wires (the two outer core wires in FIGS. 5 and 6) of the optical fiber ribbon F is larger than that of the inner core wires (the two inner core wires in FIGS. 5 and 6) of the optical fiber ribbon F.

With reference to FIG. 5, the amount of change $\varepsilon_n'$ in the strain amount of each core wire of the optical fiber ribbon F is formulated. The number of core wires of the optical fiber ribbon F is set to 4 (may be set to 3 or more), the distance from the central axis C of the optical fiber ribbon F to the central axis of the outer core wire is denoted by $r_1$, and the distance from the central axis C of the optical fiber ribbon F to the central axis of the inner core wire is denoted by $r_2$. The length of the optical fiber ribbon F in the initial state is denoted by $L_0$, the length of the optical fiber ribbon F after tension (compression) is denoted by $L_0+\Delta L$, and the torsion angle (torsion rate) per unit length of the optical fiber ribbon F is denoted by $\gamma$.

Each length $L_n'$ of the outer core wire and the inner core wire of the optical fiber ribbon F in the strained state is expressed by Equation 1. Each amount of change $\varepsilon_n'$ in the strain amounts of the outer core wire and the inner core wire of the optical fiber ribbon F is expressed by Equation 2. Here, n=1, 2 correspond to the outer and the inner.

$$L_n' = (L_0 + \Delta L)\sqrt{1 + r_n^2\gamma^2} \qquad \text{[Equation 1]}$$

$$\varepsilon_n' = \frac{L_n' - L_0}{L_0} = \left(1 + \frac{\Delta L}{L_0}\right)\sqrt{1 + r_n^2\gamma^2} - 1 \qquad \text{[Equation 2]}$$

The torsion angle calculation unit 2 calculates the amount of change $\gamma$ in the torsion angle (torsion rate) per unit length of the optical fiber ribbon F on the basis of the difference $\Delta\varepsilon'=\varepsilon_1'-\varepsilon_2'$ in amount of change in strain amount between the outer core wire and the inner core wire of the optical fiber ribbon F (torsion angle calculation step S3). The fourth graph of FIG. 3 illustrates a longitudinal distribution of the difference $\Delta_\varepsilon'$ in amount of change in strain amount of the optical fiber ribbon F. In the section where torsional and tensile (compression) strain occurs, the difference $\Delta\varepsilon'$ in amount of change in strain amount has a finite value that is not 0. The first graph of FIG. 4 illustrates a longitudinal distribution of the amount of change $\gamma$ in the torsion angle (torsion rate) per unit length of the optical fiber ribbon F. In the section where torsional and tensile (compression) strain occurs, the amount of change $\gamma$ in the torsion angle (torsion rate) per unit length has a finite value that is not 0.

With reference to FIG. 5, the difference $\Delta\varepsilon'$ in amount of change in strain amount between the outer core wire and the inner core wire of the optical fiber ribbon F, and the amount of change $\gamma$ in the torsion angle (torsion rate) per unit length of the optical fiber ribbon F are formulated. The difference $\Delta\varepsilon'$ in amount of change in strain amount between the outer core wire and the inner core wire of the optical fiber ribbon F is expressed by Equation 3. Here, $\Delta L/L_0$ is on the order of $10^{-3}$ and is much less than 1 and negligible with respect to 1. Then, the amount of change $\gamma$ in the torsion angle (torsion rate) per unit length of the optical fiber ribbon F can be calculated by using distances $r_1$ and $r_2$ from the central axis C of the optical fiber ribbon F to the central axes of the outer core wire and the inner core wire.

$$\Delta\varepsilon' = \varepsilon_1' - \varepsilon_2' = \qquad \text{[Equation 3]}$$
$$\left(1 + \frac{\Delta L}{L_0}\right)\left(\sqrt{1 + r_1^2\gamma^2} - \sqrt{1 + r_2^2\gamma^2}\right) \cong \sqrt{1 + r_1^2\gamma^2} - \sqrt{1 + r_2^2\gamma^2}$$

The torsional strain amount calculation unit 3 calculates the amount of change $\varepsilon_n$ (n=1, 2 correspond to the outer and the inner) in the strain amount caused by the torsion of each core wire of the optical fiber ribbon F on the basis of the amount of change $\gamma$ in the torsion angle (torsion rate) per unit length of the optical fiber ribbon F (torsional strain amount calculation step S4). The second graph of FIG. 4 illustrates a longitudinal distribution of the amount of change $\varepsilon_n$ in the strain amount caused by the torsion of the optical fiber ribbon F. In the section where torsional and tensile (compression) strain occurs, the amount of change $\varepsilon_n$ in the strain amount caused by the torsion of the outer core wires (the two outer core wires in FIGS. 5 and 6) of the optical fiber ribbon F is larger than that of the inner core wires (the two inner core wires in FIGS. 5 and 6) of the optical fiber ribbon F (smaller than the amount of change $\varepsilon_n'$ in the strain amount in the third graph of FIG. 4).

With reference to FIG. 6, the amount of change $\varepsilon_n$ in the strain amount caused by the torsion of each core wire of the optical fiber ribbon F is formulated. The number of core wires of the optical fiber ribbon F is set to 4 (may be set to 3 or more), the distance from the central axis C of the optical fiber ribbon F to the central axis of the outer core wire is denoted by $r_1$, and the distance from the central axis C of the optical fiber ribbon F to the central axis of the inner core wire is denoted by $r_2$. The length of the optical fiber ribbon F in the initial state is denoted by $L_0$, the tension (compression) of the optical fiber ribbon F is not generated, and the torsion angle (torsion rate) per unit length of the optical fiber ribbon F is denoted by $\gamma$.

Each length $L_n$ of the outer core wire and the inner core wire of the optical fiber ribbon F in the strained state is expressed by Equation 4. Each amount of change $\varepsilon_n$ in the strain amounts caused by torsion of the outer core wire and the inner core wire of the optical fiber ribbon F is expressed by Equation 5. Here, n=1, 2 correspond to the outer and the inner.

$$L_n = L_0\sqrt{1 + r_n^2\gamma^2} \qquad \text{[Equation 4]}$$

$$\varepsilon_n = \frac{L_n - L_0}{L_0} = \sqrt{1 + r_n^2\gamma^2} - 1 \qquad \text{[Equation 5]}$$

The tensile strain amount calculation unit 4 subtracts the amount of change $\varepsilon_n$ in the strain amount caused by the torsion of each core wire of the optical fiber ribbon F from the amount of change $\varepsilon_n'$ in the strain amount of each core wire of the optical fiber ribbon F measured by the strain amount measurement unit 1, and calculates the amount of change $\Delta\varepsilon_n=\varepsilon_n'-\varepsilon_n$ (n=1, 2 correspond to the outer and the inner) in the strain amount caused by the tension (compression) of each core wire of the optical fiber ribbon F (tensile strain amount calculation step S5). The fourth graph of FIG. 4 illustrates a longitudinal distribution of the amount of change $\Delta\varepsilon_n$ in the strain amount caused by the tension (compression) of the optical fiber ribbon F. In the section where torsional and tensile (compression) strain occurs, the amount of change $\Delta\varepsilon_n$ in the strain amount caused by the tension (compression) of the outer core wires (the two outer core wires in FIGS. 5 and 6) of the optical fiber ribbon F is as much as that of the inner core wires (the two inner core wires in FIGS. 5 and 6) of the optical fiber ribbon F (smaller than the amount of change $\varepsilon_n'$ in the strain amount in the third graph of FIG. 4).

With reference to FIG. 5, the amount of change $\Delta\varepsilon_n$ in the strain amount caused by the tension (compression) of each core wire of the optical fiber ribbon F is formulated. The amount of change $\Delta\varepsilon_n$ in the strain amount caused by the tension (compression) of each core wire of the optical fiber ribbon F is expressed by Equation 6. Here, $r_n^2\gamma_2$ is on the order of $10^{-4}$ and is much less than 1 and negligible with respect to 1 (it is a known number, so it may be taken into account). Then, $\Delta\varepsilon_n = \Delta L/L_0$ can be calculated as the amount of change in the strain amount caused by the tension (compression) of each core wire of the optical fiber ribbon F.

$$\Delta\varepsilon_n = \varepsilon_n' - \varepsilon_n = \frac{\Delta L}{L_0}\sqrt{1 + r_n^2\gamma^2} \cong \frac{\Delta L}{L_0} \qquad \text{[Equation 6]}$$

The structural strain amount calculation unit 5 calculates the amounts of change (substantially equal to $\varepsilon_n$ and $\Delta\varepsilon_n$) in the strain amounts caused by torsion and tension (compression) of the structure I in which the optical fiber ribbon F is installed on the basis of the amounts of change $\varepsilon_n$ and $\Delta\varepsilon_n$ in the strain amounts caused by the torsion and the tension (compression) of each core wire of the optical fiber ribbon F, respectively (structural strain amount calculation step S6).

As described above, it is practicable to calculate the torsion angle (torsion rate) $\gamma$ per unit length and the strain amount $\varepsilon_n$ that is due to torsion of the optical fiber ribbon F on the basis of the strain amount $\varepsilon_n'$ of each core wire of the optical fiber ribbon F, and to calculate the strain amount $\Delta\varepsilon_n$ that is due to tension (compression) of the optical fiber ribbon F.

Although the strain amount $\Delta L/L_0$ that is due to tension (compression) of the optical fiber ribbon F is an unknown amount, it is possible to easily calculate the torsion angle (torsion rate) $\gamma$ per unit length of the optical fiber ribbon F without considering the strain amount $\Delta L/L_0$ that is due to tension (compression) of the optical fiber ribbon F.

Although the torsion angle (torsion rate) $\gamma$ per unit length of the optical fiber ribbon F is a known number, it is possible to easily calculate the strain amount $\Delta L/L_0$ that is due to tension (compression) of the optical fiber ribbon F without considering the torsion angle (torsion rate) $\gamma$ per unit length of the optical fiber ribbon F.

It is possible to calculate the strain amount $\Delta\varepsilon_n$ that is due to torsion and the strain amount $\varepsilon_n$ that is due to tension (compression) of not only the optical fiber ribbon F used in optical fiber communication but also the optical fiber ribbon F used in a structural strain sensor.

INDUSTRIAL APPLICABILITY

The invention of the present disclosure is capable of calculating the strain amount that is due to torsion and the strain amount that is due to tension (compression) of not only the optical fiber ribbon used in optical fiber communication but also the optical fiber ribbon used in a structural strain sensor.

REFERENCE SIGNS LIST

S: Optical fiber strain measurement system
D: Optical fiber strain measurement device
F: Optical fiber ribbon
I: Structure
C: Central axis
1: Strain amount measurement unit
2: Torsion angle calculation unit
3: Torsional strain amount calculation unit
4: Tensile strain amount calculation unit
5: Structural strain amount calculation unit

The invention claimed is:

1. An optical fiber strain measurement method comprising, in order:
   by processing circuitry, measuring a strain amount of each core wire of an optical fiber ribbon using a Brillouin-optical time domain reflectometer (B-OTDR) or an optical frequency domain reflectometer (OFDR);
   by the processing circuitry, calculating a torsion angle per unit length of the optical fiber ribbon, based on a difference in strain amount between an outer core wire and an inner core wire of the optical fiber ribbon;
   by the processing circuitry, calculating a strain amount caused by torsion of each core wire of the optical fiber ribbon, based on the torsion angle per unit length of the optical fiber ribbon; and
   by the processing circuitry, subtracting the strain amount caused by torsion of each core wire of the optical fiber ribbon from the strain amount of each core wire of the optical fiber ribbon measured in the strain amount measurement step, and calculating a tensile strain amount caused by tension of each core wire of the optical fiber ribbon when the strain by torsion is caused in all core wires of the optical fiber ribbon.

2. The optical fiber strain measurement method according to claim 1, wherein calculating the torsion angle includes calculating the torsion angle per unit length of the optical fiber ribbon without taking an effect of tension of each core wire of the optical fiber ribbon into account.

3. The optical fiber strain measurement method according to claim 1, wherein calculating the tensile strain amount includes calculating the strain amount caused by tension of each core wire of the optical fiber ribbon without taking an effect of torsion of each core wire of the optical fiber ribbon into account.

4. The optical fiber strain measurement method according to claim 1, further comprising, subsequently, by the processing circuitry, calculating strain amounts caused by torsion and tension of a structure in which the optical fiber ribbon is installed, based on the strain amounts caused by the torsion and the tension of each core wire of the optical fiber ribbon, respectively.

5. An optical fiber strain measurement device comprising: processing circuitry configured to:
   to measure a strain amount of each core wire of an optical fiber ribbon using a Brillouin-optical time domain reflectometer (B-OTDR) or an optical frequency domain reflectometer (OFDR);
   calculate a torsion angle per unit length of the optical fiber ribbon, based on a difference in strain amount between an outer core wire and an inner core wire of the optical fiber ribbon;
   calculate a strain amount caused by torsion of each core wire of the optical fiber ribbon, based on the torsion angle per unit length of the optical fiber ribbon; and
   subtract the strain amount caused by torsion of each core wire of the optical fiber ribbon from the strain amount of each core wire of the optical fiber ribbon measured, and calculate a tensile strain amount caused by tension of each core wire of the optical fiber ribbon when the strain by torsion is caused in all core wires of the optical fiber ribbon.

6. The optical fiber strain measurement device according to claim 5, wherein the processing circuitry is configured to calculate the torsion angle per unit length of the optical fiber ribbon without taking an effect of tension of each core wire of the optical fiber ribbon into account.

7. The optical fiber strain measurement device according to claim 5, wherein processing circuitry is configured to calculate the tensile strain amount caused by tension of each core wire of the optical fiber ribbon without taking an effect of torsion of each core wire of the optical fiber ribbon into account.

8. The optical fiber strain measurement device according to claim 5, wherein the processing circuitry is further configured to calculate strain amounts caused by torsion and tension of a structure in which the optical fiber ribbon is installed, based on the strain amounts caused by the torsion and the tension of each core wire of the optical fiber ribbon, respectively.

*   *   *   *   *